United States Patent [19]

Eriksson-Lennartsson

[11] Patent Number: 4,669,107
[45] Date of Patent: May 26, 1987

[54] METHOD OF INCREASING THE NUMBER OF CALL OPTIONS IN A MOBILE TELEPHONE SYSTEM

[75] Inventor: Ulf L. K. Eriksson-Lennartsson, Skärholmen, Sweden

[73] Assignee: Telefonaktiebolaget LM Ericsson, Stockholm, Sweden

[21] Appl. No.: 852,790

[22] Filed: Apr. 16, 1986

[51] Int. Cl.⁴ .............................................. H07Q 7/01
[52] U.S. Cl. ....................................... 379/60; 379/59; 455/56; 455/33
[58] Field of Search ............... 179/2 E, 2 EB; 458/33; 455/34, 56

[56] References Cited

U.S. PATENT DOCUMENTS

| | | | |
|---|---|---|---|
| 4,435,840 | 3/1984 | Kojima et al. | 455/33 |
| 4,475,010 | 10/1984 | Huensch et al. | 179/2 EB |
| 4,481,670 | 11/1984 | Freeburg | 455/33 |
| 4,485,486 | 11/1984 | Webb et al. | 455/33 |
| 4,525,861 | 6/1985 | Freeburg | 455/33 |
| 4,597,105 | 6/1986 | Freeburg | 455/33 |

FOREIGN PATENT DOCUMENTS

| | | | |
|---|---|---|---|
| 0042529 | 12/1981 | European Pat. Off. | 455/33 |
| 0143640 | 8/1983 | Japan | 455/33 |

Primary Examiner—Robert Lev
Attorney, Agent, or Firm—Roberts, Spiecens & Cohen

[57] ABSTRACT

A method of increasing the number of call options in a mobile telephone system with a mobile telephone exchange (MTX) and a number of base radio stations (B1-B8). The method utilizes the overlap existing between the coverage areas (A2,A5), between two base stations, one (A2) with low traffic intensity and the other (A5) with high traffic intensity. A mobile station (MB) in the area (A5) with the higher intensity is controlled such that it communicates via a channel belonging to the base station (B2) for the coverage area (A2) with the lower traffic intensity.

3 Claims, 2 Drawing Figures

METHOD OF INCREASING THE NUMBER OF
CALL OPTIONS IN A MOBILE TELEPHONE
SYSTEM

FIELD OF THE INVENTION

The present invention relates to a method of increasing the number of call options in a mobile telephone system. The method contemplates that already existing radio channels within two or more contiguous coverage areas in a mobile telephone system are better utilized by unloading a heavily loaded coverage area.

BACKGROUND

In "Ericsson review" No. 1, 1980 there is generally described an automatic public mobile telephone system for connecting motorized subscribers to each other via the public telephone network. The basic units included in such a system, such as mobile subscriber equipment (mobile stations), base radio stations and telephone exchange equipment are described in the article. In particular there is described the so-called "hand-off" function (see page 30 "switch-pver principles"), i.e. when a mobile subscriber is switched over during a call in progress from one base station to another in the case where the mobile subscriber moves from the coverage area of one base station to the coverage area of the adjacent base station.

SUMMARY OF THE INVENTION

In a mobile telephone system of the kind described above the coverage areas of the different base stations overlap, i.e. the coverage area for a given base station partially covers the area for an adjacent base station. As a result, a mobile subscriber who is in the vicinity of a contiguous coverage area can get acceptable speech quality over a radio channel belonging to the base station in the contiguous area.

The present invention has the object of utilizing this property of the mobile telephone system. The method in accordance with the invention is particularly well suited to such mobile telephone systems where a plurality of base stations have coverage areas covering a metropolitan central area with high traffic intensity, and which need unloading so that unnecessary congestion in telephony traffic will not occur.

BRIEF DESCRIPTION OF DRAWINGS

The invention will now be described in detail with reference to the accompanying drawing.

FIG. d1 schematically illustrates a mobile telephone system pertaining to the prior art.

DETAILED DESCRIPTION OF BEST MODES FOR CARRYING OUT THE INVENTION

In describing of the invention, proposed method the emphasis will be placed on the properties of the mobile telephone system which are essential to the method. The article from "Ericsson Review" is referred to in respect of properties such as calling, channel selection, frequency plan, range, etc. The known mobile telephone system schematically illustrated in FIG. 1 has a mobile telephone exchange MTX, which is wired to a plurality of base stations B1, B2, . . . B8. The exchange MTX connects the base stations B1-B8 to the public telephone network and to each other via direct lines.

Each base station B1-B8 has a given coverage area A1-A8 within which the mobile subscribers may move. Each subscriber can thus communicate with good transmission quality via his base station. For a connected call, radio signals are sent in duplex from a mobile station MB in the coverage area A5 to the base station B5, and either further to the mobile telephone exchange MTX of the system, or to another mobile subscriber within the same coverage area.

It is assumed that the traffic load on the base stations B3, B4, B5, B6, B7 and B8 is greater than that on the base stations B1 and B2, for example, because the base stations B3-B8 each serve an urban area with a large number of mobile subscribers and thus each has a relatively small coverage area. On the other hand, the base stations B1 and B2 serve subscribers within a less heavily built-up area, and thus a smaller number of subscribers. The number of available radio channels in each of the base stations B3-B8 may be greater than that in either of the base stations B1 and B2, but in spite of this the number is not sufficient to avoid congestion at high traffic intensity in the areas A3-A8. Information on traffic load is up-dated continuously by the exchange MTX supervising the traffic load at each base station at any instant.

Figure 1:
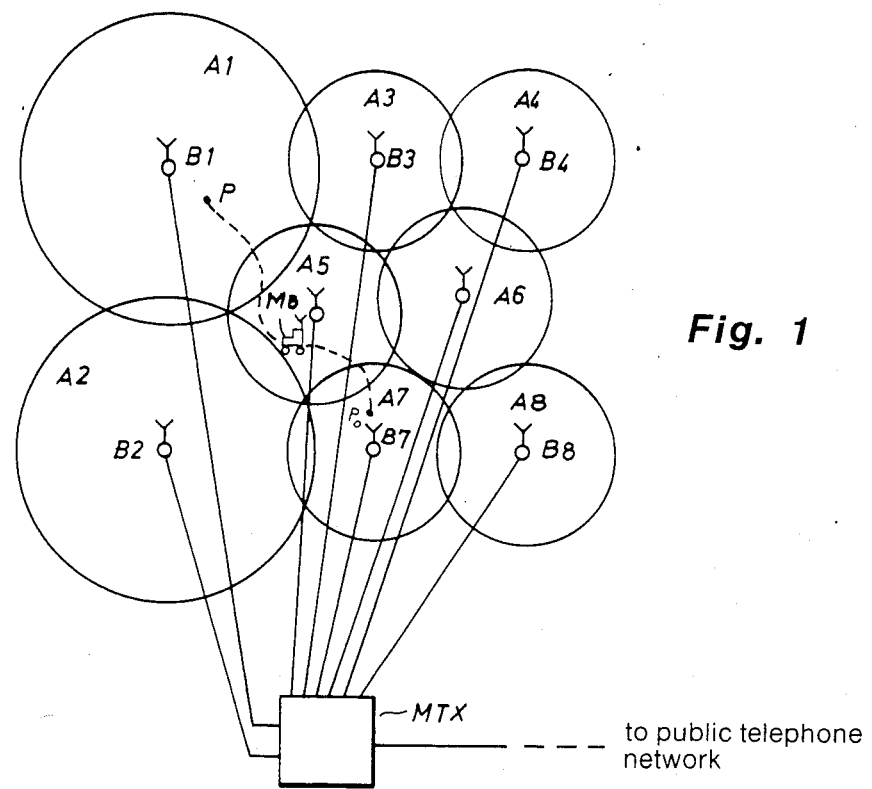

It will be seen from FIG. 1 that the areas A1 and A2 partially overlap the areas A3, A5, and A5, A7. According to the proposed method, this is utilized by having a mobile station which is sufficiently close to the area A1 or A2 switched over to the same or another radio channel belonging to the base station B1 or B2, without the mobile station having the intention of passing the boundary to the area A1 or A2.

Figure 2:
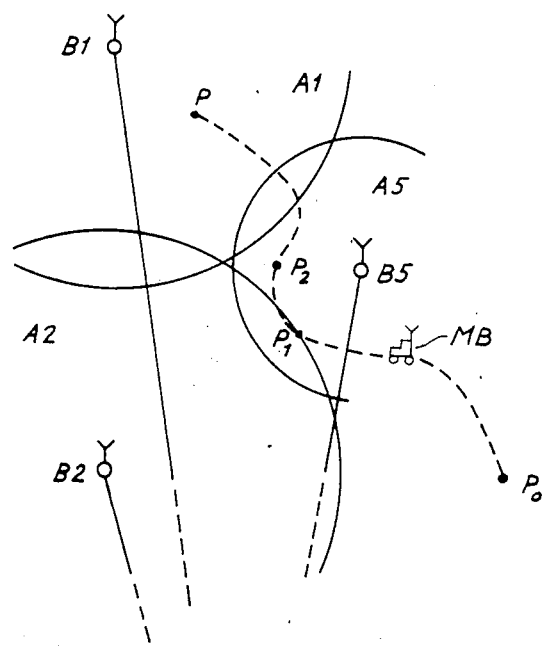
FIG. 2 shows in detail a certain part of the system according to FIG. 1 in order to explain the invention.

FIG. 2 shows this in more detail. The mobile station MB starts originally from the point $P_o$ (in the area A7) and has then been assigned a channel in the base station B7. When the mobile station MB goes over the boundary between A7 and A5, "hand-off" takes place in a known manner. The exchange MTX gives the base stations B1 and B2 an order to measure the signal strength from the mobile MB transmitter, simultaneously as a speech channel in the base station B5 is assigned to this mobile station MB. When the mobile station MB approaches the boundary for the area A2, point $P_1$, and if the signal strength is found to be acceptable, i.e. it exceeds a given value $S_o$, "hand-off" takes place without the mobile station leaving the area A5. The mobile station can now utilize the unoccupied channel in the base station B2 until the signal strength falls below the value $S_o$, e.g. at the point $P_2$. If the signal strength of MB then measured by the base station B1 is sufficient, "hand-off" takes place in respect of this station. The base station B1 then definitely takes over, according to the example in FIG. 2, the call connection for the mobile station MB, since the latter will move into the area A1. Using the proposed method, a radio channel has been released in the area A5 from the time the mobile MB has left the point $P_1$, and this channel can thus be utilized for other subscribers in the heavily loaded area A5. And vice versa, a mobile station which is connected to the base station B2 can move far into the coverage area A5 without the call being switched over to the base station B5.

The mobile telephone exchange MTX obtains information as to the path $P_o, P_1 \ldots P$ of the mobile station, by the dialled number to the subscriber in the area A1, assigning a radio channel according to the above then taking place. The mobile telephone exchange capacity must thus be increased to be able to order the base stations B1 and B2 to measure the signal strength coming from the mobile station MB. Consequently, the method should not be used other than at high traffic intensity in the areas A3–A8, particularly in the case where there are further coverage areas at the areas A4, A6, A8 (not illustrated). Available traffic statistics may be used to determine the time intervals when the traffic intensity is so high that the method according to the above is suitable. For example, the system clock of the mobile telephone exchange can be utilized to command monitoring of the signal strength of the mobile subscribers. Alternatively, the mobile telephone exchange MTX can continuously monitor, according to the above, how high the traffic load is in each base station, and from this information control the execution of "hand-off".

What is claimed is:

1. A method of increasing the number of call options in a mobile telephone system having a given number of radio channels and a base station (B5) within a heavily loaded first area (A5) comprising a part of the total coverage area of the telephone system, a given number of radio channels and a base station (B2) within at least one second area (A2) with low traffic intensity contiguous to, and partially overlapping the first area, and a mobile telephone exchange (MTX) connected to the base stations and to a public telephone network via direct lines, said method comprising:

monitoring in the mobile telephone exchange (MTX) the signal strength of subscriber signals on the radio channels from the base stations (B5 and B2) within the areas (A5 and A2); and switching a call from a channel in the first area (A5) to an unoccupied channel in the second area (A2) under the control of the mobile telephone exchange (MTX) when the signal strength of a given subscriber signal in said unoccupied channel exceeds a given value (So) and irrespective of the subscriber signal strength at the base station (B5) in the first area (A5).

2. A method as claimed in claim 1, wherein said switching of the call is carried out in response to continuous monitoring of the traffic load by the mobile telephone exchange (MTX).

3. A method as claimed in claim 1 wherein said monitoring is carried out at predetermined time periods.

* * * * *